US011911323B1

(12) United States Patent
Nimeck et al.

(10) Patent No.: US 11,911,323 B1
(45) Date of Patent: Feb. 27, 2024

(54) WHEELCHAIR PROPULSION SYSTEM

(71) Applicant: Game Changer Technologies Inc., Victoria (CA)

(72) Inventors: Brent C. Nimeck, Victoria (CA); Jeffrey R. Scott, Victoria (CA)

(73) Assignee: GAME CHANGER TECHNOLOGIES INC., Victoria (CA)

( * ) Notice: Subject to any disclaimer, the term of this patent is extended or adjusted under 35 U.S.C. 154(b) by 0 days.

(21) Appl. No.: 18/304,613

(22) Filed: Apr. 21, 2023

Related U.S. Application Data

(63) Continuation of application No. PCT/CA2022/051027, filed on Jun. 28, 2022.

(60) Provisional application No. 63/216,126, filed on Jun. 29, 2021.

(51) Int. Cl.
*A61G 5/04* (2013.01)

(52) U.S. Cl.
CPC .................................... *A61G 5/04* (2013.01)

(58) Field of Classification Search
CPC ........................................................ A61G 5/04
See application file for complete search history.

(56) References Cited

U.S. PATENT DOCUMENTS

| | | | |
|---|---|---|---|
| 4,961,473 | A | 10/1990 | Jones |
| 5,366,037 | A | 11/1994 | Richey |
| 5,818,189 | A | 10/1998 | Uchiyama et al. |
| 5,878,829 | A | 3/1999 | Kanno et al. |
| 5,996,716 | A | 12/1999 | Montiglio et al. |
| 6,009,964 | A | 1/2000 | Ishida |
| 6,481,514 | B2 | 11/2002 | Takada |
| 7,234,554 | B2 | 6/2007 | Mulhern et al. |
| 7,959,176 | B2 | 6/2011 | Bidwell et al. |
| 8,037,953 | B2 | 10/2011 | Puskar-Pasewicz et al. |
| 8,727,048 | B2 | 5/2014 | Jurkiewicz et al. |
| 8,915,513 | B2 | 12/2014 | Franca |
| 8,931,796 | B2 | 1/2015 | Nasser |
| 10,265,228 | B2 | 4/2019 | Richter |
| 10,945,899 | B2 | 3/2021 | Peskin et al. |
| 2007/0096427 | A1 | 5/2007 | Knaub |

(Continued)

FOREIGN PATENT DOCUMENTS

| | | | |
|---|---|---|---|
| CH | 693462 A5 * | 8/2003 | ............ F16D 41/28 |
| CN | 105167926 A * | 12/2015 | |

(Continued)

*Primary Examiner* — Jacob D Knutson
(74) *Attorney, Agent, or Firm* — Oyen Wiggs Green & Mutala LLP

(57) ABSTRACT

An electric wheelchair propulsion system for a wheelchair. The propulsion system has a first and a second torque transfer hub rotatably mounted to a respective first and second drive wheel of the wheelchair, and an elongated axle tube arranged between the first and second hubs. First and second motors are arranged within the axle tube extending from opposing ends thereof. First and second drive axles are insertable into bores of the first and second hubs respectively, and are operatively connected to the first and second motors respectively. Means are provided to control the actuation of the motors. Actuation of the motors drives a rotation thereof, transferring a torque to the drive axles. The drive axles in turn transfer a torque to the hubs, thereby rotating the drive wheels.

33 Claims, 8 Drawing Sheets

(56) References Cited

U.S. PATENT DOCUMENTS

| | | | |
|---|---|---|---|
| 2007/0216131 | A1 | 9/2007 | Potappel |
| 2010/0300777 | A1 | 12/2010 | Tallino |
| 2013/0033092 | A1 | 2/2013 | Wu |
| 2016/0317368 | A1 | 11/2016 | Bach Castillo |
| 2018/0271725 | A1 | 9/2018 | Kita |
| 2020/0253798 | A1 | 8/2020 | Mizuno et al. |

FOREIGN PATENT DOCUMENTS

| | | | | | |
|---|---|---|---|---|---|
| DE | 102011011385 | B4 | | 1/2013 | |
| DE | 102016118032 | A1 | | 1/2018 | |
| DE | 102016118032 | A1 | * | 1/2018 | |
| DE | 102019111299 | A1 | * | 11/2020 | |
| EP | 3508184 | A1 | | 7/2019 | |
| JP | H09117476 | A | * | 5/1997 | |
| JP | H10211239 | A | | 8/1998 | |
| JP | 2004001682 | A | | 1/2004 | |
| JP | 3631525 | B2 | | 3/2005 | |
| JP | 3631526 | B2 | | 3/2005 | |
| JP | 2017074173 | A | | 4/2017 | |
| JP | 6523131 | B2 | | 5/2019 | |
| KR | 200340307 | Y1 | * | 3/2004 | |
| KR | 20130024843 | A | | 3/2013 | |
| KR | 20130107487 | A | | 10/2013 | |
| WO | WO-2016204668 | A1 | * | 12/2016 | ............. A61G 5/045 |
| WO | 2018215163 | A1 | | 11/2018 | |

* cited by examiner

WHEELCHAIR PROPULSION SYSTEM

CROSS-REFERENCE TO RELATED APPLICATIONS

This application is a continuation of PCT application No. PCT/CA2022/051027 filed 28 Jun. 2022, which claims priority from U.S. application No. 63/216,126 filed 29 Jun. 2021 and entitled WHEELCHAIR PROPULSION SYSTEM which is hereby incorporated herein by reference for all purposes. For purposes of the United States of America, this application claims the benefit under 35 U.S.C. § 119 of U.S. application No. 63/216,126 filed 29 Jun. 2021 and entitled WHEELCHAIR PROPULSION SYSTEM.

FIELD OF THE INVENTION

The invention pertains to electric wheelchair propulsion systems, in particular, those with two motors to enable a user to propel in both forward and rearward directions.

BACKGROUND

Electric propulsion systems for wheelchairs are known in the art. Such electric propulsion systems allow users to propel the wheelchair electrically by controlling the actuation of an electric motor. Existing electric propulsion systems for wheelchairs are heavy and mechanically complex, thereby increasing the cost to manufacture and repair. There is a need in the wheelchair industry for a lightweight propulsion system with a simpler mechanism for providing electric power to propel a wheelchair. The present invention is directed to improved propulsion systems for wheelchairs.

SUMMARY

The invention provides a wheelchair propulsion system. The propulsion system has a first and a second torque transfer hub rotatably mounted to a respective first and second drive wheel of the wheelchair, and an elongated axle tube arranged between the first and second hubs. First and second motors are arranged within the axle tube extending from opposing ends thereof. First and second drive axles are insertable into bores of the first and second hubs respectively, and are operatively connected to the first and second motors respectively. The first and second motors control the movement of the first and second drive wheels respectively. Means are provided to control the actuation of the motors. Actuation of the motors drives a rotation thereof, transferring a torque to the drive axles. The drive axles in turn transfer a torque to the hubs, thereby rotating the drive wheels.

In some embodiments, the first and second drive axles are operatively connected to the first and second motors by first and second couplers. The first coupler is arranged to connect the first drive axle to the first motor and the second coupler is arranged to connect the second drive axle to the second motor. The drive axles lock into position within the axle tube by engaging with the couplers, ensuring proper alignment with the couplers and the motors.

In some embodiments, the first and second drive axles are operatively connected to the first and second motors without first and second couplers. In such embodiments, a first and a second torque transfer profile are arranged on a respective surface of an end of the first and second motors. The first and second torque transfer profiles are shaped to engage with the first and second drive axles respectively, operatively connecting the first motor with the first drive axle and the second motor with the second drive axle.

An aspect of the invention provides a hub for mounting to a wheel of a wheelchair. The hub comprises a torque receiving member mounted within the hub. The torque receiving member is shaped to engage with a drive axle, in particular, to engage with a torque transfer member on the drive axle. The torque receiving member may comprise a torque bushing fitted within the hub, or may be integrally formed within the hub.

Further aspects of the invention and features of specific embodiments of the invention are described below.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
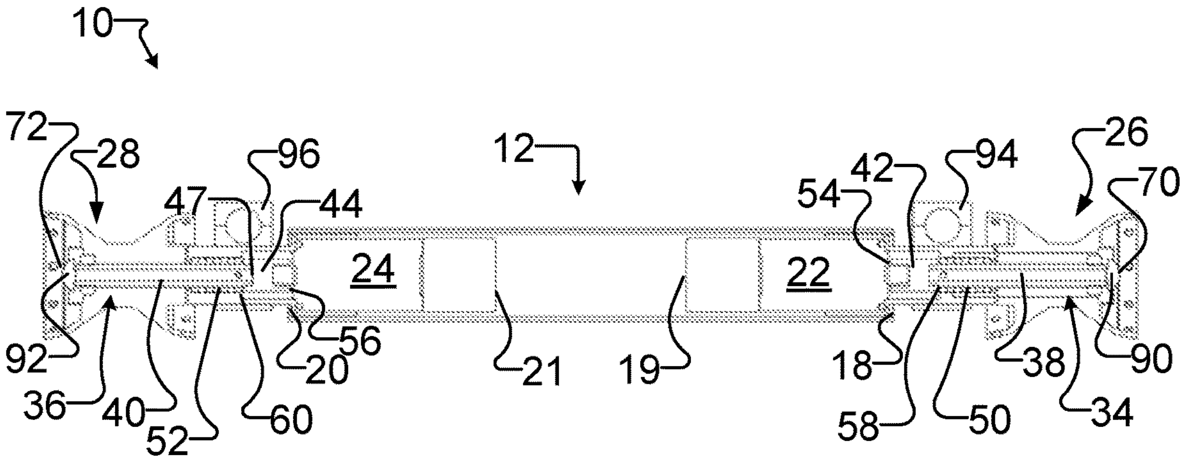
FIG. 1 is a front elevational sectional view of the wheelchair propulsion system according to one embodiment of the invention.
Figure 2:
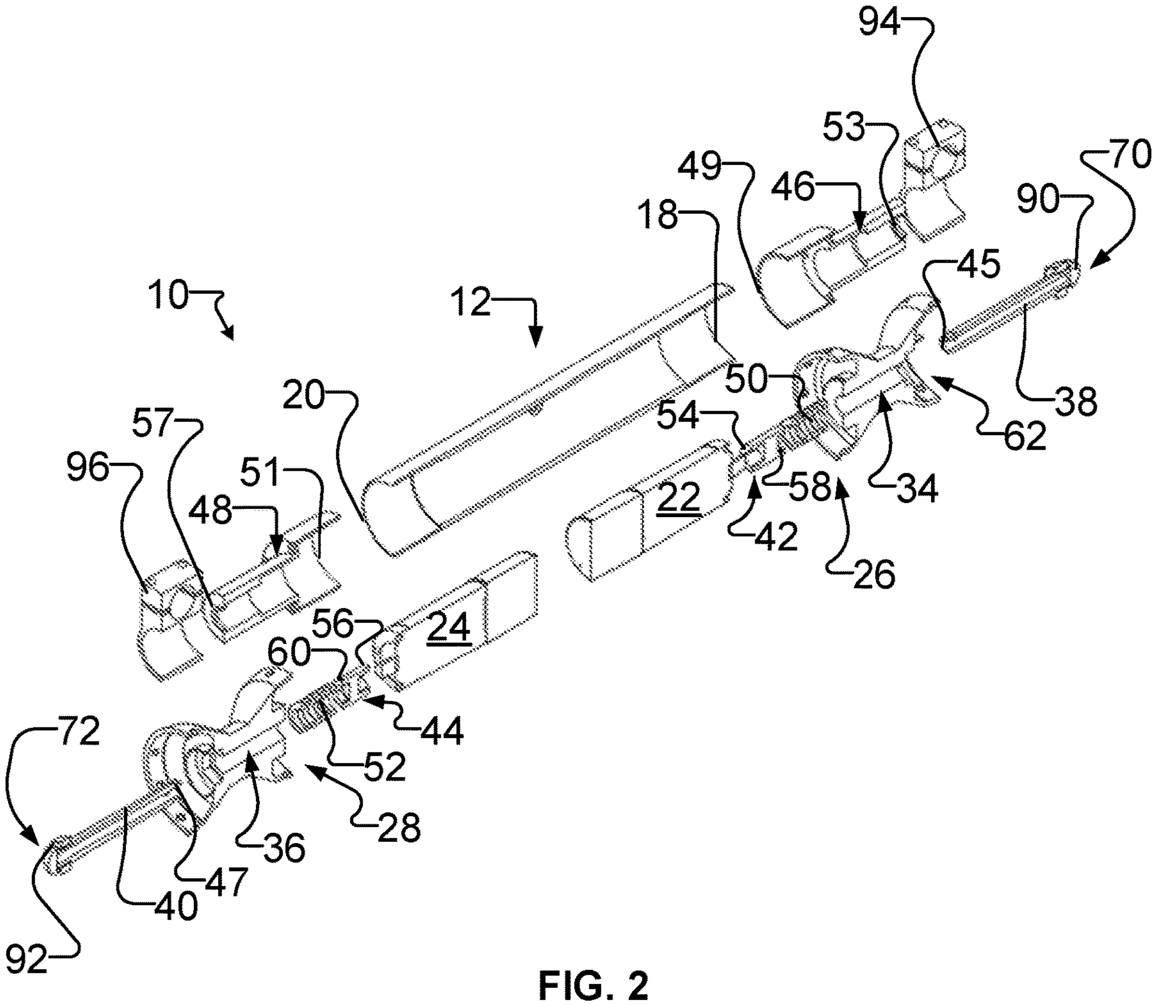
FIG. 2 is an exploded view of the propulsion system of FIG. 1.
Figure 3:
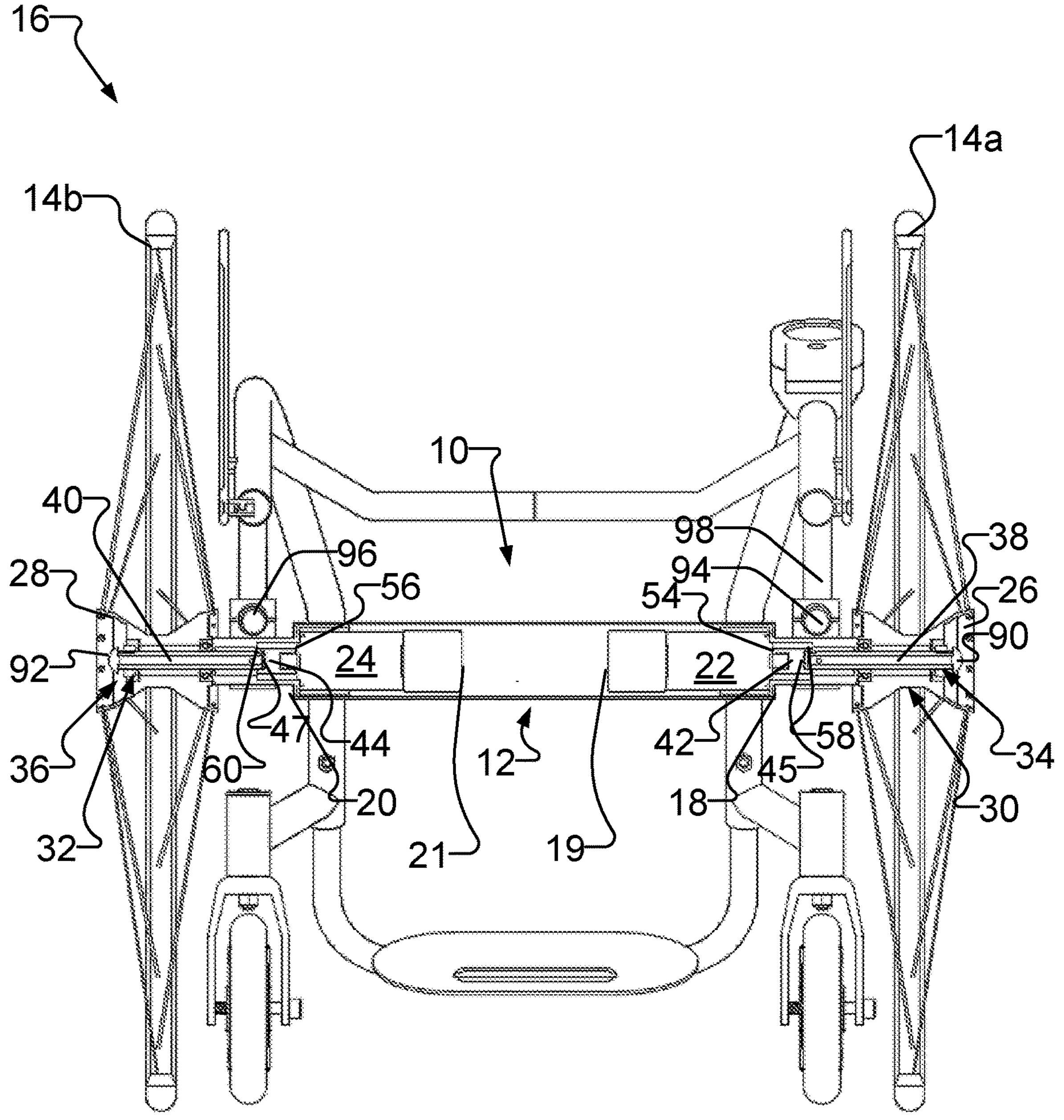
FIG. 3 is a front elevational sectional view of the propulsion system of FIG. 1 installed between a pair of drive wheels of a wheelchair.
Figure 4:
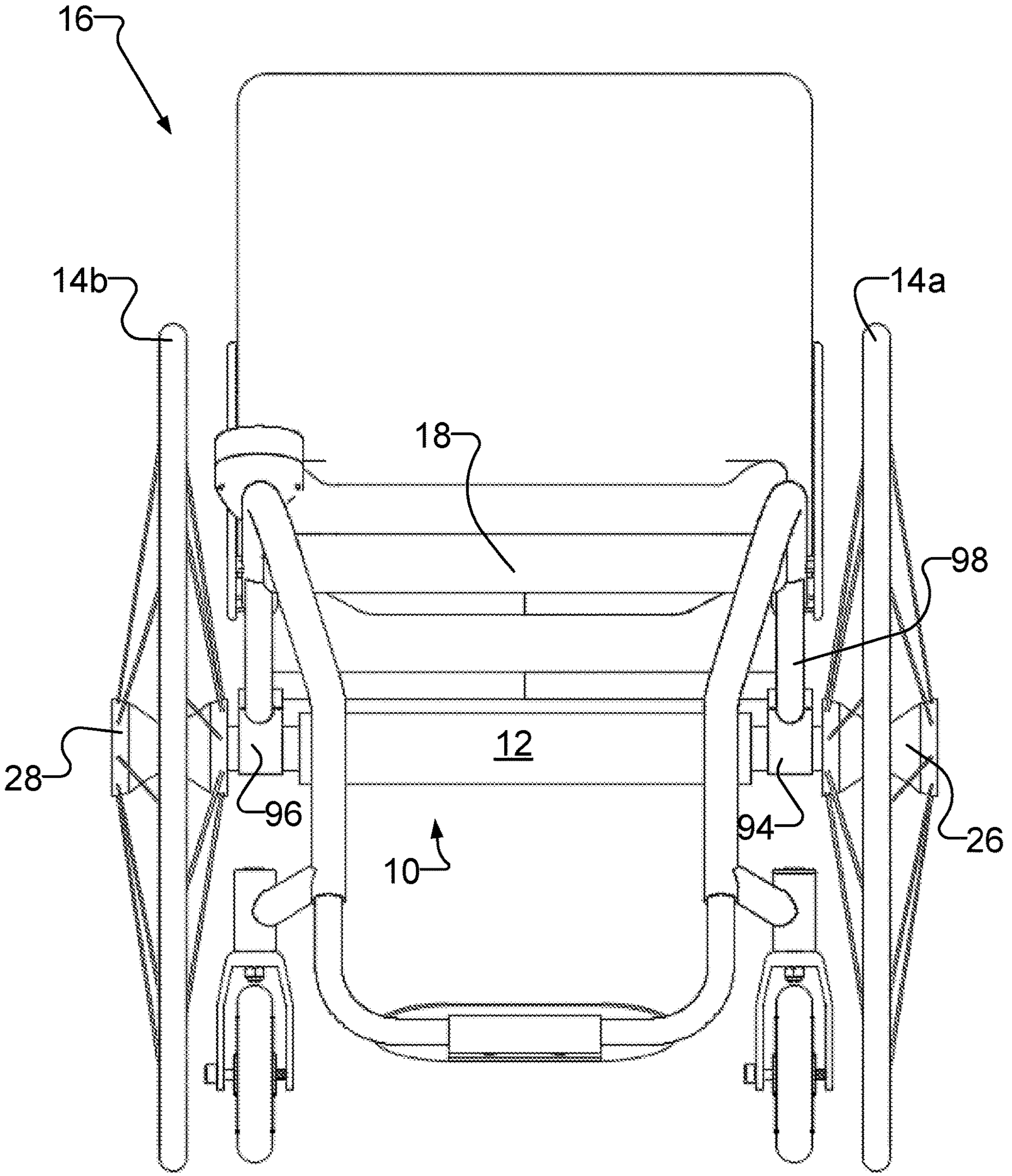
FIG. 4 is a front elevational view of a wheelchair showing the propulsion system of FIG. 1 installed thereto.

Referring to FIGS. 1 to 4, in one embodiment the apparatus of the invention is a wheelchair propulsion system 10. The propulsion system 10 assists the propulsion of a manual wheelchair 16 by providing electric power thereto. The apparatus of this invention allows a user to propel the wheelchair 16 manually or electrically, and to transition between the two modes seamlessly. The propulsion system 10 may be retrofitted onto a conventional manual wheelchair 16.

The propulsion system 10 has an elongated, hollow axle tube 12 dimensioned to be arranged between a pair of drive wheels 14*a*, 14*b* below a seat 18 of the wheelchair 16. First and second motors 22, 24 are arranged within the axle tube 12. The first motor 22 extends from a first end 18 of the axle tube 12 to a first point 19 within the axle tube 12 to rotate the first drive wheel 14*a*. The second motor 24 extends from a second opposing end 20 of the axle tube 12 to a second point 21 within the axle tube 12 to rotate the second drive wheel 14*b*. The motors 22, 24 may be any suitable electric motors including for example brushed or brushless planetary gear motors and direct drive motors.

Figure 7:
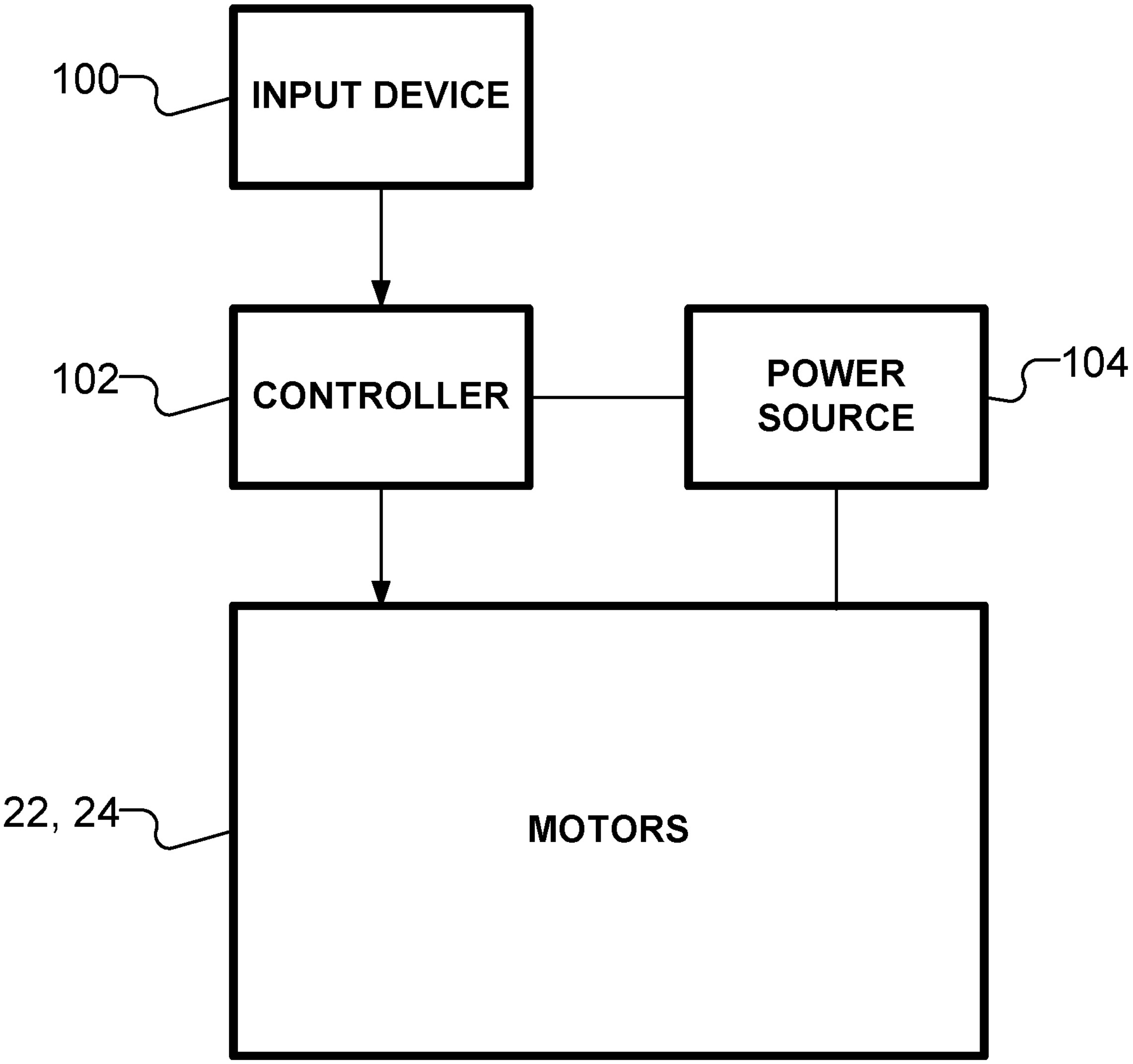
FIG. 7 is a schematic view of the propulsion system of FIG. 1.

Means are provided to control the actuation of the motors 22, 24. As shown schematically in FIG. 7, such means may include a controller 102 connected to an input device 100 for receiving signals therefrom, and to the motors 22, 24 for transmitting signals thereto, responsive to the input signals received from the input device 100. The input device 100, controller 102 and motors 22, 24 may be wirelessly connected. A power source 104, such as a rechargeable battery, may be connected to supply power to the controller 102 and the motors 22, 24. The input device 100, controller 102 and power source 104 may be arranged at any suitable location on the wheelchair 16. For example, the controller 102 and power source 104 may be mounted under the seat 18, and the input device 100 may be mounted on an armrest of the wheelchair 16.

The input device 100 may for example be a man-machine interface (MMI) such as in the form of a joystick, accelerometer, remote control, and/or an mobile phone application which can be wired or wirelessly connected to the controller 102 (e.g., by Bluetooth™ or Wi-Fi connectivity), or a brain-machine interface (BMI) provided in the form of a computer chip implanted in the brain of the user for sending commands to the controller 102.

First and second rotatable torque transfer hubs 26, 28 are mounted within a centerbore 30, 32 of each of the drive wheels 14*a*, 14*b*. The first and second torque transfer hubs 26, 28 each have a central bore 34, 36 for receiving a respective first and second drive axles 38, 40 therethrough. The first and second drive axles 38, 40 are insertable through the central bores 34, 36 for engagement with a respective first and second couplers 42, 44 at first ends 45, 47 of the drive axles 38, 40. First and second couplers 42, 44 engage with the respective first and second motors 22, 24 at one end 54, 56, and the respective first ends 45, 47 of the first and second drive axles 38, 40 at their opposite ends 58, 60, thereby connecting the axle tube 12 to the first and second torque transfer hubs 26, 28.

First and second axle housings 46, 48 may be arranged to connect the axle tube 12 at their first ends 49, 51, and to the torque transfer hubs 26, 28 at their second, opposite ends 53, 57. The first and second axle housings 46, 48 provide a space for receiving at least the respective first and second couplers 42, 44 and a length of the first and second drive axles 38, 40. The first and second drive axles 38, 40 extend through the central bores 34, 36 of the torque transfer hubs 26, 28 into the first and second axle housings 46, 48 for engagement with the first and second couplers 42, 44 so as to secure the first and second drive axles 38, 40 in a lock position. The locking of the first and second drive axles 38, 40 ensures proper alignment of the couplers 42, 44 to the respective motors 22, 24, allowing the axles 38, 40 to rotate.

Mechanical bearings 50, 52 and/or torque receiving members 62, 64 may be provided to facilitate the rotation of the drive axles 38, 40 and thereby the first and second torque transfer hubs 26, 28. The mechanical bearings 50, 52 may be arranged within the first and second axle housings 46, 48 and/or within the central bores 34, 36 of the torque transfer hubs 26, 28 dimensioned to surround a length of the drive axles 38, 40.

Figure 5:
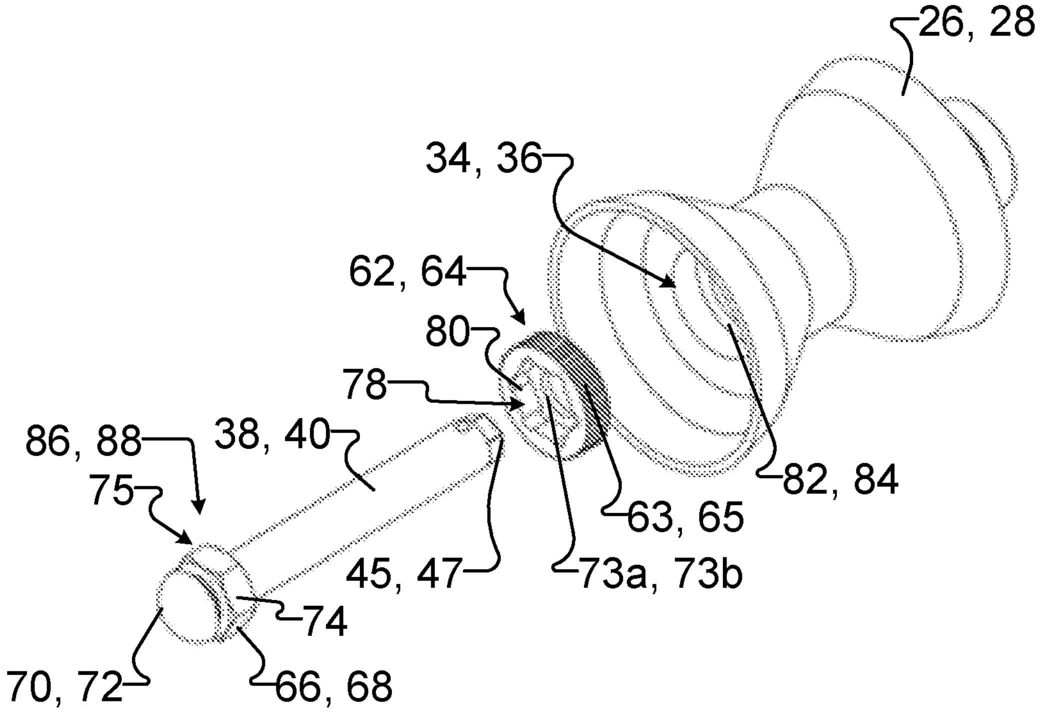
FIG. 5 is an exploded view of the drive axle, the rotatable torque transfer hub, and the torque receiving member of the propulsion system of FIG. 1.

As shown in FIG. 5, in some embodiments, the torque receiving members 62, 64 each comprises a torque bushing 63, 65, which may be mounted to an outer end 82, 84 of the central bores 34, 36 of the first and second torque transfer hubs 26, 28 for engagement with a respective torque transfer member 86, 88 on the drive axles 38, 40, facilitating the transfer of a torque from the rotation of the drive axles 38, 40 to the torque transfer hubs 26, 28. FIG. 5 is an exploded view illustrating a drive axle 38, 40 and a torque transfer hub 26, 28 in combination with a torque bushing 63, 65 according to an example embodiment. Referring to FIG. 5, each of the drive axles 38, 40 includes a nut 66, 68 as the torque transfer member 86, 88. The nut 66, 68 is arranged to surround a length of the drive axle 38, 40 adjacent to a respective second end 70, 72 of the drive axle 38, 40. Each of the nuts 66, 68 has one or more flat faces 74 arranged on its outer periphery 75 shaped to be received within a slot 73*a*, 73*b* of the torque bushings 63, 65. Each of the torque bushings 63, 65 is defined by an inner periphery 78 having one or more flat faces 80, shaped to complement the one or more flat faces 74 on the outer periphery 75 of the nut 66, 68.

Figure 6:
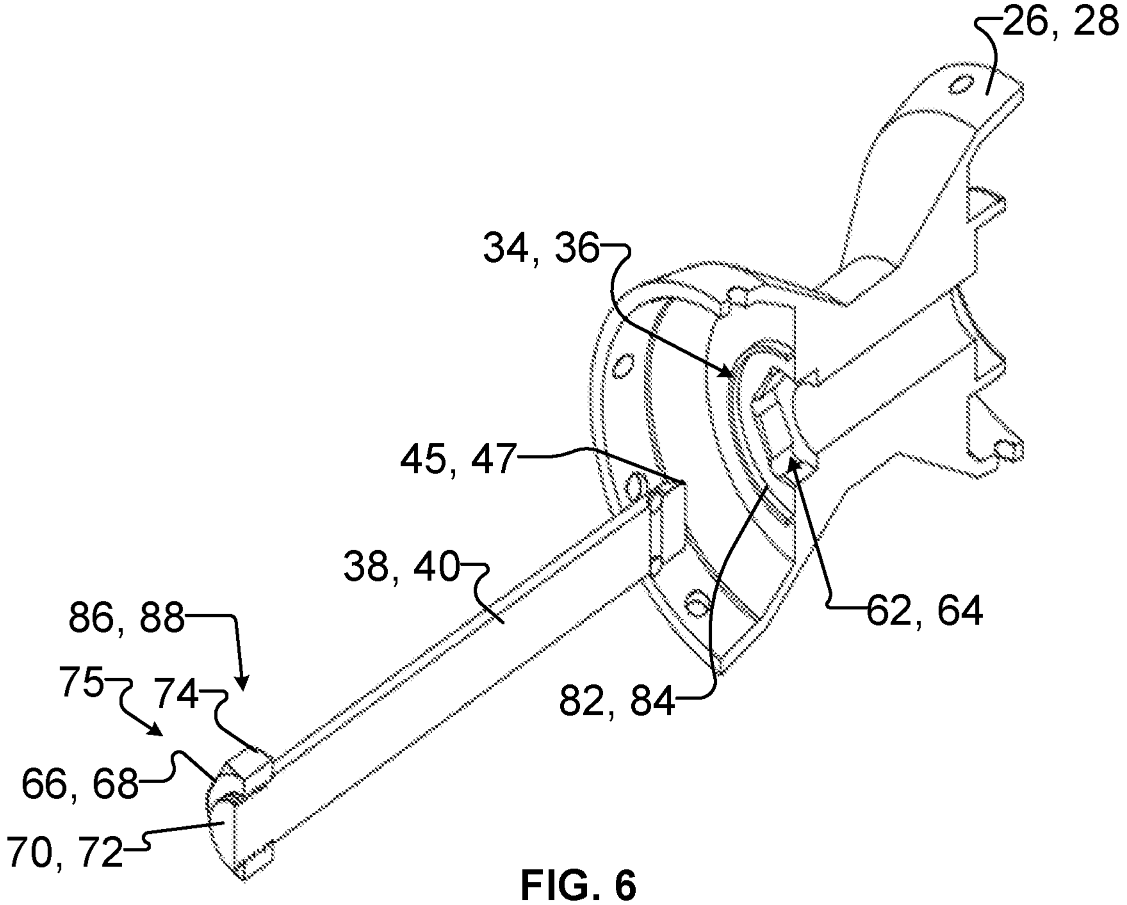
FIG. 6 is an exploded sectional view of the drive axle and the rotatable torque transfer hub of the propulsion system of FIG. 1, showing the torque receiving member integrally formed within the torque transfer hub.

In some embodiments, the torque receiving members 62, 64 may be integrally arranged at the outer ends 82, 84 of the central bores 34, 36 of each of the torque transfer hubs 26, 28, as shown in FIG. 6. In such embodiments, one or more flat faces shaped to receive the torque transfer members 86, 88 on the drive axles 38, 40 may be contoured at the outer ends 82, 84 of the central bores 34, 36 of the torque transfer hubs 26, 28, thereby omitting the need for torque bushings 63, 65.

The torque transfer member 86, 88 may be arranged at any point along the length of the drive axles 38, 40. In some embodiments, the torque transfer members 86, 88 may be integrally formed on the surfaces of the drive axles 38, 40. For example, a length of the drive axles 38, 40 may be contoured with one or more flat faces for engagement with the torque receiving members 62, 64. This embodiment omits the need for the nut 66, 68.

First and second mounting brackets 94, 96 may be arranged to secure the wheelchair propulsion system 10 to a frame 98 of the wheelchair 16. First and second mounting brackets 94, 96 may be mounted at any suitable locations on the wheelchair propulsion system 10, such as the first and second axle housings 46, 48. The mounting 25 brackets 94, 96 may be secured to any suitable positions along the frame 98 of the wheelchair 16.

Figure 8:
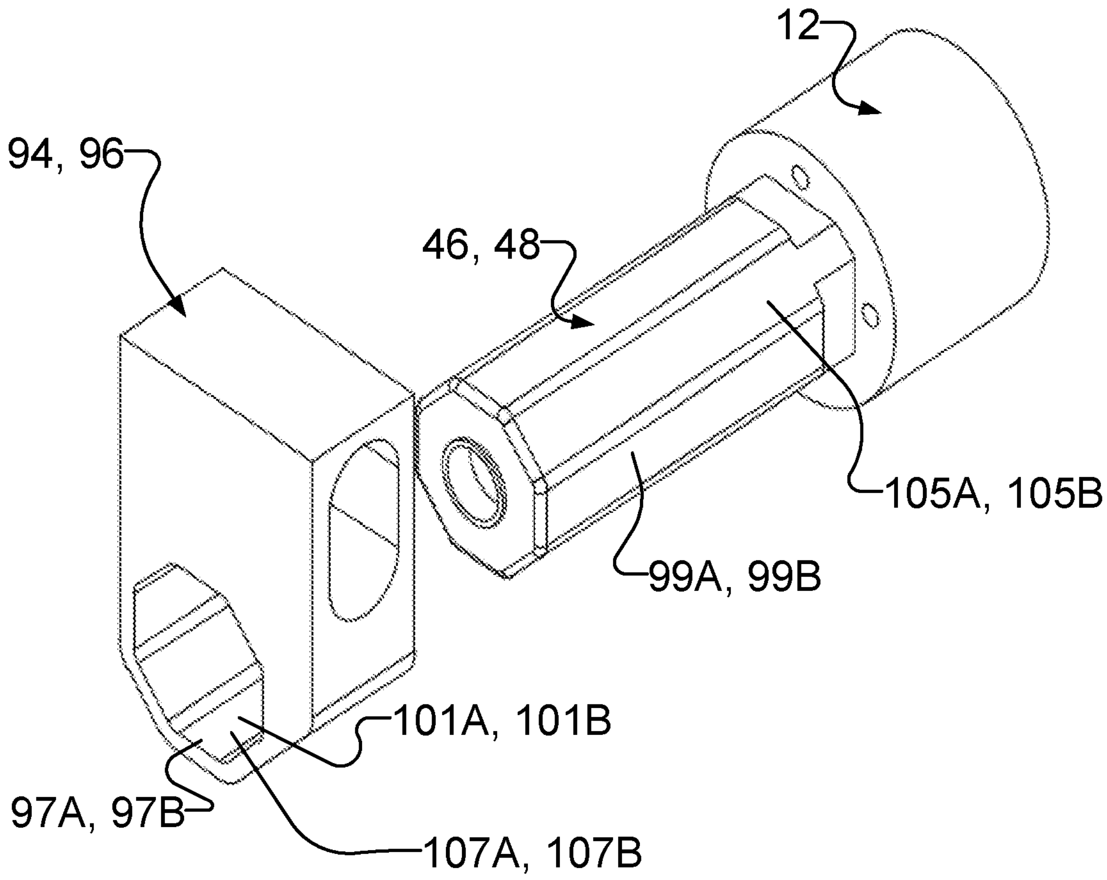
FIG. 8 is a perspective view of an example axle housing and mounting bracket of the propulsion system of FIG. 1.

Referring to FIG. 8, the first and second mounting brackets 94, 96 each have an opening 97A, 97B for receiving the first and second axle housings 46, 48 respectively. In 30 some embodiments, the cross-sectional shapes of the outer peripheries 99A, 99B of the first and second axle housings 46, 48 are circular. In such embodiments, the cross-sectional shapes of the openings 97A, 97B of the first and second mounting brackets 94, 96 are circular, with the openings 97A, 97B having smooth inner surfaces 101A, 101B. In other embodiments, the outer peripheries 99A, 99B of the first and second axle housings 46, 48 are defined by one or more flat surfaces 105A, 105B being contoured thereon. In such embodiments, the inner surfaces 101A, 101B of the openings 97A, 97B of the first and second mounting brackets 94, 96 are defined by one or more flat surfaces 107A, 107B being contoured thereon, the flat surfaces 107A, 107B complementing the one or more flat surfaces 105A, 105B defined on the axle housings 46, 48. In one example, eight flat surfaces 101A, 101B, 105A, 105B are contoured on the axle housings 46, 48 and within the openings 97A, 97B of the mounting brackets 94, 96, such that the cross-sectional shape of the axle housings 46, 48 and openings 97A, 97B is an octagon. The contour profiles of the axle housings 46, 48 and the openings 97A, 97B of the mounting brackets 94, 96 assist in retaining the torque applied to the drive axles 38, 40.

The drive axles 38, 40 may comprise a releasable mechanism. For example, the drive axles 38, 40 may each comprise a push button 90, 92 at their second ends 70, 72. The activation of the push buttons 90, 92 releases the drive axles 38, 40 out of engagement from the first and second couplers 42, 44, allowing the torque transfer hubs 26, 28 to disengage from the axle tube 12 and the axle housings 46, 48, allowing the drive wheels 14*a*, 14*b* to be removed from the wheelchair 16 without using any tools.

Figure 9:
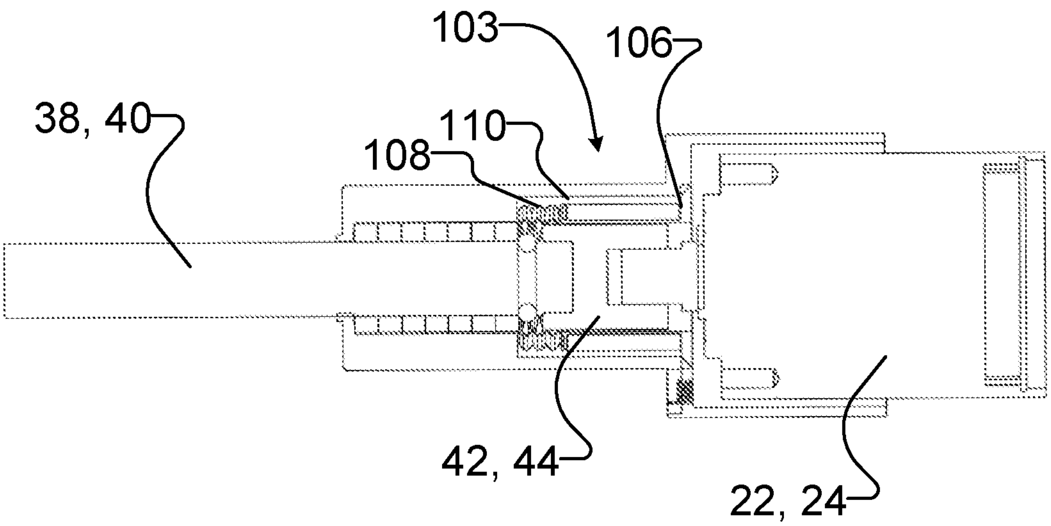
FIG. 9 is a front elevational sectional view of an example disconnect device of the propulsion system of FIG. 1, showing the drive axle engaged with the coupler.
Figure 10:
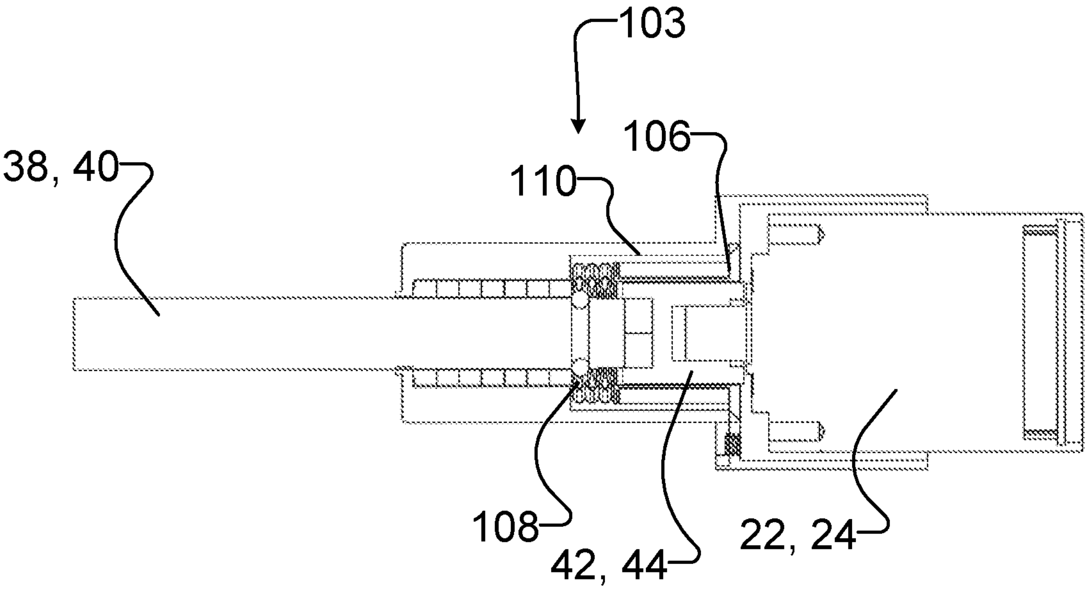
FIG. 10 is a front elevational sectional view of the disconnect device of FIG. 9, showing the drive axle disengaged from the coupler.

In some embodiments, means are provided to move the couplers 42, 44 in a longitudinal direction of the axles tube 12 between an extended position in which the couplers 42, 44 engage the respective drive axles 38, 40 so as to rotatably drive the torque transfer hubs 26, 28, and a retracted position in which the couplers 42, 44 disengage from the respective drive axles 38, 40 to disconnect the source of rotational power to the torque transfer hubs 26, 28. Such means may include any suitable disconnect devices, such as an electromechanical disconnect device. FIGS. 9 and 10 show an example solenoid operated mechanism as the disconnect device. As shown in the FIGS. 9 and 10 example embodiments, a solenoid operated mechanism 103 includes a solenoid body 106 arranged to surround the coupler 42, 44, a solenoid winding 110 arranged to surround the solenoid body 106, and a wave spring 108 arranged to be in contact with the coupler 42, 44. To move the coupler 42, 44 into the extended position to engage with the respective drive axles 38, 40, the coupler 42, 44 is energized with a magnetic field, moving the spring 108 into a compressed position towards the drive axles 38, 40 (see FIG. 9). To move the coupler 42, 44 to the retracted position, the coupler 42, 44 is not energized, and thus the wave spring 108 returns to its normal unstressed position, releasing the drive axle 38, 40 from engagement with the couplers 42, 44 (see FIG. 10).

The propulsion system 10 operates according to the following method. The motors 22, 24 are actuated, under the control of the controller 102 which receives from the input device 100 an input from the user. The actuation of the motors 22, 24 drive a rotation thereof, transferring a torque to the respective drive axles 38, 40. The drive axles 38, 40 transfer a torque to the respective torque transfer hubs 26, 28 so as to rotate the respective drive wheels 14*a*, 14*b*. The drive wheels 14*a*, 14*b* may also be manually propelled by a user by controlling the movement of the drive wheels 14*a*, 14*b*.

Additional features may be incorporated with the propulsion system 10 to enhance the functionality of the wheelchair 16. These features include for example a braking system such as a regenerative braking system, accelerometer, cruise control, autopilot capability, Global Positioning System (GPS), wireless battery charging, regenerative battery charging, Universal Serial Bus (USB) ports, voice activation and speakers.

The wheelchair propulsion system 10 may be mechanically simplified to reduce the number of component parts. This can be done in many different ways. The following are non-limiting examples of some of those ways.

In some embodiments, the axle tube 12 and the first and second axle housings 46, 48 are integrally formed to form a housing. In example embodiments, the housing is formed of two cross-sectional portions comprising a first housing section and a second housing section. The first housing section may comprise a first cross-sectional portion of each of the axle tube 12 and the first and second axle housings 46, 48, and the second housing section may comprise a second cross-sectional portion of each of the axle tube 12 and the first and second axle housings 46, 48. The first and second cross-section portions may have the same shape and/or size, or different. The first and second cross-section portions may be joined together to form the housing after the first and second motors 22, 24, and first and second couplings 42, 44 and/or mechanical bearings 50, 52 (if present) are placed therein.

Figure 11:
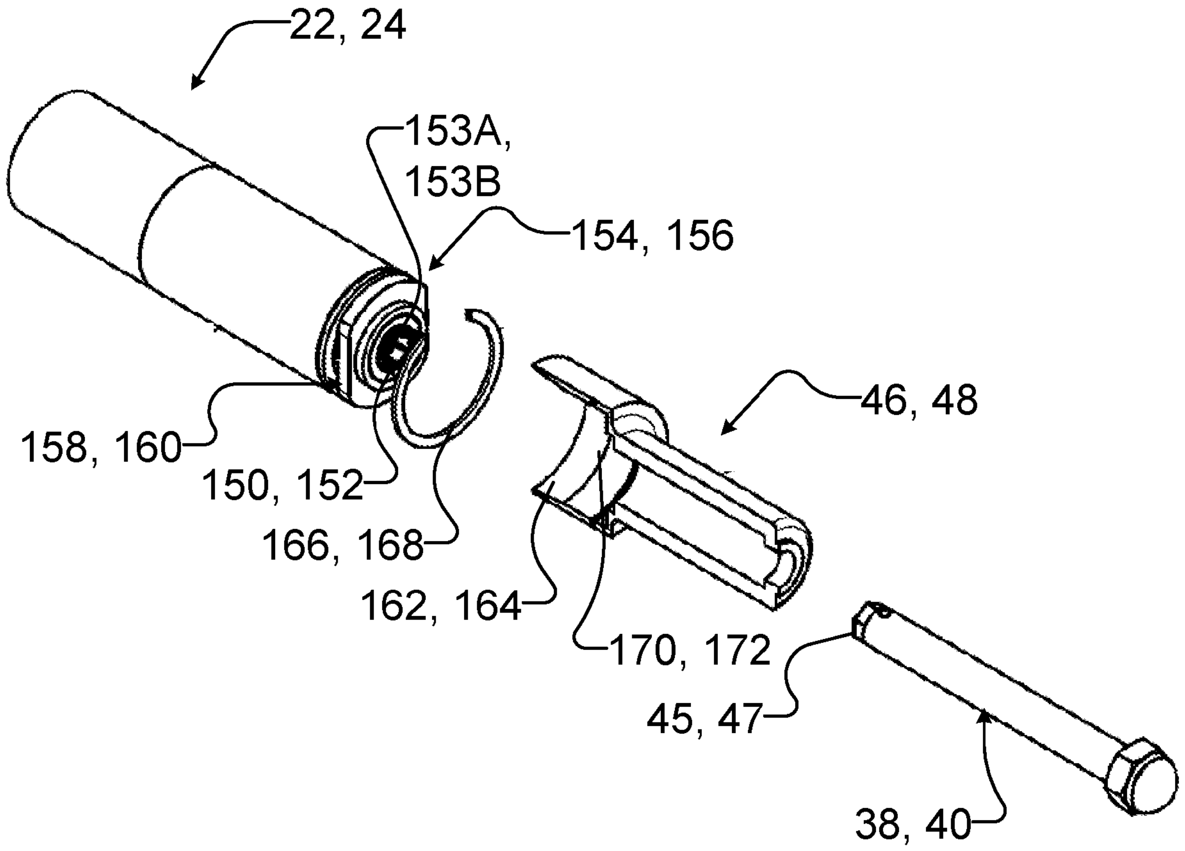
FIG. 11 is an exploded perspective view of a motor, axle housing and drive axle according to another example embodiment.

In some embodiments, separate components for the first and second couplings 42, 44 are not required. The first and second couplings 42, 44 may be integrally formed on the first and second motors 22, 24 respectively. FIG. 11 illustrates an example embodiment. In example embodiments, the first and second motors 22, 24 each comprises a torque transfer profile 150, 152 arranged on a surface 153A, 153B at one end 154, 156 thereof. The torque transfer profiles 150, 152 may each comprise one or more surfaces, shaped to engage with the first and second drive axles 38, 40. In some embodiments, the torque transfer profiles 150, 152 are each shaped to engage with the respective first ends 47 of the first and second drive axles 38, 40.

In some embodiments, the first and second motors 22, 24 are connected to the respective first and second axle housings 46, 48 with fasteners means such as screws. In other embodiments, the first and second motors 22, 24 are connectable to the respective first and second axle housings 46, 48 without fastener means. In example embodiments, as illustrated in FIG. 11, the first and second motors 22, 24 each comprises a locking profile 158, 160 arranged at the one end 154, 156 thereof. An inner surface 162, 164 of the respective first and second axle housings 46, 48 may be contoured, shaped and sized to engage with the respective locking profile 158, 160, thereby interlocking the first and second motors 22, 24 within the first and second axle housings 46, 48 respectively. In some embodiments, a retaining ring 166, 168 is arranged between the respective first and second motors 22, 24 and the respective first and second axle housings 46, 48. The retaining ring 166, 168 may be dimensioned to surround at least a portion of the respective motor 22, 24. In some embodiments, the inner surface 162, 164 of the first and second axle housings 46, 48 comprise a respective first and second groove 170, 172, sized to receive the respective retaining ring 166, 168. This secures the first and second motors 22, 24 in position within the first and second axle housings 46, 48, advantageously preventing rotational torque and lateral movement of the motors 22, 24 during use.

Throughout the foregoing description and the drawings, in which corresponding and like parts are identified by the same reference characters, specific details have been set forth in order to provide a more thorough understanding to persons skilled in the art. However, well known elements may not have been shown or described in detail or at all to avoid unnecessarily obscuring the disclosure.

As will be apparent to those skilled in the art in the light of the foregoing disclosure, many alterations and modifications are possible in the practice of this invention without departing from the scope thereof. Accordingly, the description and drawings are to be regarded in an illustrative, rather than a restrictive, sense.

The invention claimed is:

1. A wheelchair propulsion system (10) comprising:

first and second rotatable hubs (26, 28) for mounting to first and second wheels (14*a*, 14*b*) of a wheelchair (16) respectively;

an elongated axle tube (12) arranged between the first and second hubs;

first and second motors (22, 24) arranged within the axle tube extending from opposing ends thereof (18, 20); and first and second drive axles (38, 40) extendable through entire lengths of bores (34, 36) of the first and second rotatable hubs respectively, the first and second drive axles releasably operatively connecting the respective first and second motors to the respective first and second rotatable hubs, wherein actuation of the first and second motors transfers a torque to the first and second drive axles and to the first and second hubs, thereby rotating the first and second wheels respectively, and wherein the first and second drive axles each comprises a releasable mechanism configured to move the drive axle between an engagement position for engagement of the first and second drive axles with the respective first and second motors and the respective first and second hubs and a disengagement position for disengagement of the first and second drive axles from the respective first and second motors and the respective first and second hubs, and wherein the first and second motors comprise first and second torque transfer profiles (150, 152) respectively, the first and second torque transfer profiles arranged to engage with the first and second drive axles respectively so as to operatively connect the first drive axle to the first motor and the second drive axle to the second motor.

2. The wheelchair propulsion system according to claim 1, wherein the disengagement of the first and second drive axles from the respective first and second motors and the respective first and second hubs releases the respective first and second wheels from the wheelchair propulsion system.

3. The wheelchair propulsion system according to claim 1, wherein the first and second drive axles are configured for tool-less removal of the first and second wheels.

4. The wheelchair propulsion system according to claim 1, wherein the first and second drive axles are operatively connected to the first and second motors by first (42) and second (44) couplers, the first coupler arranged to connect the first drive axle to the first motor and the second coupler arranged to connect the second drive axle to the second motor.

5. The wheelchair propulsion system according to claim 1, further comprising first and second torque receiving members (62, 64) mounted within the first and second hubs respectively, wherein the first and second torque receiving members are shaped to engage with the first and second drive axles respectively.

6. The wheelchair propulsion system according to claim 5, wherein the first and second drive axles comprise first and second torque transferring members (86, 88) shaped to engage with the first and second torque receiving members.

7. The wheelchair propulsion system according to claim 5, wherein the first and second torque receiving members are integrally formed within the first and second hubs respectively, or comprise first and second torque bushings (63, 65) respectively.

8. The wheelchair propulsion system according to claim 1, further comprising first and second axle housings (46, 48) each having a first end (49, 51) and an opposing second end (53, 57), the first ends engaging with opposing ends of the axle tube and the second ends engaging with the first and second hubs respectively, wherein the first and second axles are insertable into the bores of the respective first and second hubs and at least a length of the first and second axle housings.

9. The wheelchair propulsion system according to claim 1, further comprising means (100, 102) for controlling an actuation of the first and second motors.

10. The wheelchair propulsion system according to claim 9, wherein the means for controlling the actuation of the first and second motors comprise a controller (102) connected to an input device (100) for receiving a signal therefrom, and to the first and second motors for transmitting the signal thereto.

11. The wheelchair propulsion system according to claim 1, wherein the first and second motors comprise a planetary motor or a direct drive motor.

12. A wheelchair having a wheelchair propulsion system according to claim 1 operatively mounted thereon.

13. The wheelchair propulsion system according to claim 1, further comprising:

first and second axle housings (46, 48) each having a first end (49, 51) and an opposing second end (53, 57), the first ends engaging with opposing ends of the axle tube and the second ends engaging with the first and second hubs respectively, wherein the first and second axles are insertable into the bores of the respective first and second hubs and at least a length of the first and second axle housings; and first and second mounting brackets (94, 96) mounted to the first and second axle housings respectively arranged to secure the axle tube to a frame of the wheelchair.

14. A wheelchair propulsion system (10) comprising:

first and second rotatable hubs (26, 28) for mounting to first and second wheels (14*a*, 14*b*) of a wheelchair (16) respectively;

an elongated axle tube (12) arranged between the first and second hubs;

first and second motors (22, 24) arranged within the axle tube extending from opposing ends thereof (18, 20);

first and second drive axles (38, 40) extendable through entire lengths of bores (34, 36) of the first and second rotatable hubs respectively, the first and second drive axles releasably operatively connecting the respective first and second motors to the respective first and second rotatable hubs; and first and second torque receiving members (62, 64) mounted within the first and second hubs respectively, wherein the first and second torque receiving members are shaped to engage with the first and second drive axles respectively, wherein actuation of the first and second motors transfers a torque to the first and second drive axles and to the first and second hubs, thereby rotating the first and second wheels respectively, and wherein the first and second drive axles each comprises a releasable mechanism configured to move the drive axle between an engagement position for engagement of the first and second drive axles with the respective first and second motors and the respective first and second hubs and a disengagement position for disengagement of the first and second drive axles from the respective first and second motors and the respective first and second hubs, and wherein the first and second torque receiving members are integrally formed within the first and second hubs respectively.

15. The wheelchair propulsion system according to claim 14, wherein the first and second motors comprise first and second torque transfer profiles (150, 152) respectively, the first and second torque transfer profiles arranged to engage with the first and second drive axles respectively so as to operatively connect the first drive axle to the first motor and the second drive axle to the second motor.

16. The wheelchair propulsion system according to claim 14, wherein the first and second drive axles are operatively connected to the first and second motors by first (42) and second (44) couplers, the first coupler arranged to connect the first drive axle to the first motor and the second coupler arranged to connect the second drive axle to the second motor, and wherein the wheelchair propulsion system further comprises means (103) for moving the first and second couplers in a longitudinal axis of the axle tube, between positions to engage with and disengage from the first and second drive axles.

17. The wheelchair propulsion system according to claim 14, further comprising:

first and second axle housings (46, 48) each having a first end (49, 51) and an opposing second end (53, 57), the first ends engaging with opposing ends of the axle tube and the second ends engaging with the first and second hubs respectively, wherein the first and second axles are insertable into the bores of the respective first and second hubs and at least a length of the first and second axle housings; and first and second mounting brackets (94, 96) mounted to the first and second axle housings respectively arranged to secure the axle tube to a frame of the wheelchair.

18. A wheelchair propulsion system (10) comprising:

first and second rotatable hubs (26, 28) for mounting to first and second wheels (14*a*, 14*b*) of a wheelchair (16) respectively;

an elongated axle tube (12) arranged between the first and second hubs;

first and second motors (22, 24) arranged within the axle tube extending from opposing ends thereof (18, 20); and first and second drive axles (38, 40) extendable through entire lengths of bores (34, 36) of the first and second rotatable hubs respectively, the first and second drive axles releasably operatively connecting the respective first and second motors to the respective first and second rotatable hubs; and first and second torque receiving members (62, 64) mounted within the first and second hubs respectively, wherein the first and second torque receiving members are shaped to engage with the first and second drive axles respectively, wherein actuation of the first and second motors transfers a torque to the first and second drive axles and to the first and second hubs, thereby rotating the first and second wheels respectively, and wherein the first and second drive axles each comprises a releasable mechanism configured to move the drive axle between an engagement position for engagement of the first and second drive axles with the respective first and second motors and the respective first and second hubs and a disengagement position for disengagement of the first and second drive axles from the respective first and second motors and the respective first and second hubs, and wherein the first and second torque receiving members comprise first and second torque bushings (63, 65) respectively.

19. The wheelchair propulsion system according to claim 18, wherein the first and second motors comprise first and second torque transfer profiles (150, 152) respectively, the first and second torque transfer profiles arranged to engage with the first and second drive axles respectively so as to operatively connect the first drive axle to the first motor and the second drive axle to the second motor.

20. The wheelchair propulsion system according to claim 18, wherein the first and second drive axles are operatively connected to the first and second motors by first (42) and second (44) couplers, the first coupler arranged to connect the first drive axle to the first motor and the second coupler arranged to connect the second drive axle to the second motor, and wherein the wheelchair propulsion system further comprises means (103) for moving the first and second couplers in a longitudinal axis of the axle tube, between positions to engage with and disengage from the first and second drive axles.

21. The wheelchair propulsion system according to claim 18, further comprising:

first and second axle housings (46, 48) each having a first end (49, 51) and an opposing second end (53, 57), the first ends engaging with opposing ends of the axle tube and the second ends engaging with the first and second hubs respectively, wherein the first and second axles are insertable into the bores of the respective first and second hubs and at least a length of the first and second axle housings; and first and second mounting brackets (94, 96) mounted to the first and second axle housings respectively arranged to secure the axle tube to a frame of the wheelchair.

22. A wheelchair propulsion system (10) comprising:

first and second rotatable hubs (26, 28) for mounting to first and second wheels (14*a*, 14*b*) of a wheelchair (16) respectively;

an elongated axle tube (12) arranged between the first and second hubs;

first and second motors (22, 24) arranged within the axle tube extending from opposing ends thereof (18, 20);

first and second drive axles (38, 40) extendable through entire lengths of bores (34, 36) of the first and second rotatable hubs respectively, the first and second drive axles releasably operatively connecting the respective first and second motors to the respective first and second rotatable hubs, wherein the first and second drive axles are operatively connected to the first and second motors by first (42) and second (44) couplers, the first coupler arranged to connect the first drive axle to the first motor and the second coupler arranged to connect the second drive axle to the second motor; and means (103) for moving the first and second couplers in a longitudinal axis of the axle tube, between positions to engage with and disengage from the first and second drive axles, wherein actuation of the first and second motors transfers a torque to the first and second drive axles and to the first and second hubs, thereby rotating the first and second wheels respectively, and wherein the first and second drive axles each comprises a releasable mechanism configured to move the drive axle between an engagement position for engagement of the first and second drive axles with the respective first and second motors and the respective first and second hubs and a disengagement position for disengagement of the first and second drive axles from the respective first and second motors and the respective first and second hubs.

23. The wheelchair propulsion system according to claim 22, further comprising first and second torque receiving members (62, 64) mounted within the first and second hubs respectively, wherein the first and second torque receiving members are shaped to engage with the first and second drive axles respectively.

24. The wheelchair propulsion system according to claim 23, wherein the first and second torque receiving members are integrally formed within the first and second hubs respectively, or comprise first and second torque bushings (63, 65) respectively.

25. The wheelchair propulsion system according to claim 22, further comprising:

first and second axle housings (46, 48) each having a first end (49, 51) and an opposing second end (53, 57), the first ends engaging with opposing ends of the axle tube and the second ends engaging with the first and second hubs respectively, wherein the first and second axles are insertable into the bores of the respective first and second hubs and at least a length of the first and second axle housings; and first and second mounting brackets (94, 96) mounted to the first and second axle housings respectively arranged to secure the axle tube to a frame of the wheelchair.

26. A wheelchair propulsion system (10) comprising:

first and second rotatable hubs (26, 28) for mounting to first and second wheels (14*a*, 14*b*) of a wheelchair (16) respectively;

an elongated axle tube (12) arranged between the first and second hubs;

first and second motors (22, 24) arranged within the axle tube extending from opposing ends thereof (18, 20);

first and second drive axles (38, 40) extendable through entire lengths of bores (34, 36) of the first and second rotatable hubs respectively, the first and second drive axles releasably operatively connecting the respective first and second motors to the respective first and second rotatable hubs; and first and second axle housings (46, 48) each having a first end (49, 51) and an opposing second end (53, 57), the first ends engaging with opposing ends of the axle tube and the second ends engaging with the first and second hubs respectively, wherein the first and second axles are insertable into the bores of the respective first and second hubs and at least a length of the first and second axle housings; and first and second mounting brackets (94, 96) mounted to the first and second axle housings respectively arranged to secure the axle tube to a frame of the wheelchair, wherein actuation of the first and second motors transfers a torque to the first and second drive axles and to the first and second hubs, thereby rotating the first and second wheels respectively, and wherein the first and second drive axles each comprises a releasable mechanism configured to move the drive axle between an engagement position for engagement of the first and second drive axles with the respective first and second motors and the respective first and second hubs and a disengagement position for disengagement of the first and second drive axles from the respective first and second motors and the respective first and second hubs.

27. The wheelchair propulsion system according to claim 26, wherein the first and second mounting brackets each comprises an opening (97*a*, 97*b*) shaped to receive the first and second axle housings, respectively.

28. The wheelchair propulsion system according to claim 27, wherein a cross-sectional shape of the openings of the first and second mounting brackets and the first and second axle housing is circular.

29. The wheelchair propulsion system according to claim 27, wherein a cross-sectional shape of the openings of the first and second mounting brackets and the first and second axle housing is a polygon.

30. The wheelchair propulsion system according to claim 26, wherein the first and second motors comprise first and second torque transfer profiles (150, 152) respectively, the first and second torque transfer profiles arranged to engage with the first and second drive axles respectively so as to operatively connect the first drive axle to the first motor and the second drive axle to the second motor.

31. The wheelchair propulsion system according to claim 26, further comprising first and second torque receiving members (62, 64) mounted within the first and second hubs respectively, wherein the first and second torque receiving members are shaped to engage with the first and second drive axles respectively.

32. The wheelchair propulsion system according to claim 31, wherein the first and second torque receiving members are integrally formed within the first and second hubs respectively, or comprise first and second torque bushings (63, 65) respectively.

33. The wheelchair propulsion system according to claim 26, wherein the first and second drive axles are operatively connected to the first and second motors by first (42) and second (44) couplers, the first coupler arranged to connect the first drive axle to the first motor and the second coupler arranged to connect the second drive axle to the second motor, and wherein the wheelchair propulsion system further comprises means (103) for moving the first and second couplers in a longitudinal axis of the axle tube, between positions to engage with and disengage from the first and second drive axles.

* * * * *